United States Patent
Schwarz et al.

(10) Patent No.: US 10,297,150 B2
(45) Date of Patent: *May 21, 2019

(54) LOW-POWER VEHICLE DETECTION

(71) Applicant: IPS Group Inc., San Diego, CA (US)

(72) Inventors: Alexander Schwarz, San Diego, CA (US); Stephen John Hunter, Randpark Extension (ZA)

(73) Assignee: IPS GROUP INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,290

(22) Filed: Jun. 26, 2017

(65) Prior Publication Data

US 2018/0025629 A1   Jan. 25, 2018

Related U.S. Application Data

(63) Continuation of application No. 14/116,641, filed on Jul. 28, 2015, now Pat. No. 9,728,085, which is a
(Continued)

(51) Int. Cl.
*G08B 23/00* (2006.01)
*G08G 1/017* (2006.01)
(Continued)

(52) U.S. Cl.
CPC ............. *G08G 1/017* (2013.01); *G01D 4/002* (2013.01); *G07F 17/246* (2013.01); *G01D 4/004* (2013.01); *Y02B 70/346* (2013.01); *Y04S 20/525* (2013.01)

(58) Field of Classification Search
CPC .......... G07F 17/00; G07F 17/24; G07B 15/02
See application file for complete search history.

(56) References Cited

U.S. PATENT DOCUMENTS 2,161,046 A   6/1939   Hitzeman
2,822,682 A   2/1958   Sollenberger
(Continued)

FOREIGN PATENT DOCUMENTS

CA   2377010 A1   10/2001
CA   2363915 A1   5/2003
(Continued)

OTHER PUBLICATIONS

Cell Net Data Systems. First Wireless Monitoring of Parking Meters Results in Theft Arrests Using CellNet Data Systems Technology. PRNewswire, May 11, 1999, 2 pgs.
(Continued)

*Primary Examiner* — Joseph H Feild
*Assistant Examiner* — Rufus C Point
(74) *Attorney, Agent, or Firm* — Wilson Sonsini Goodrich & Rosati

(57) ABSTRACT

A parking meter detects an object in proximity, based on a change in a proximity measurement at the meter, activates a directional sensor in response to detecting the object, receives sensor data at a meter processor from the directional sensor, wherein the received sensor data indicates a predetermined direction to the detected object relative to the meter. The parking meter determines a presence of the object, or lack thereof, in the predetermined direction based on the sensor data, and upon a positive determination of the presence of the object, stores an indication of the presence of the object along with a time of the positive determination.

18 Claims, 6 Drawing Sheets

Related U.S. Application Data continuation of application No. 13/558,242, filed on Jul. 25, 2012, now Pat. No. 9,127,964.

(60) Provisional application No. 61/511,484, filed on Jul. 25, 2011.

(51) Int. Cl.
*G01D 4/00* (2006.01)
*G07F 17/24* (2006.01)

(56) References Cited

U.S. PATENT DOCUMENTS

| | | | |
|---|---|---|---|
| 2,832,506 A | 4/1958 | Hatcher | |
| D189,106 S | 10/1960 | Leiderman | |
| 2,988,191 A | 6/1961 | Grant | |
| 3,183,411 A * | 5/1965 | Palfi | G07F 17/246 |
| | | | 340/932.2 |
| 3,535,870 A * | 10/1970 | Mitchell | G07F 17/246 |
| | | | 368/6 |
| 3,721,463 A | 3/1973 | Attwood et al. | |
| 3,999,372 A * | 12/1976 | Welch | G07F 17/246 |
| | | | 368/6 |
| 4,043,117 A * | 8/1977 | Maresca | G07F 17/246 |
| | | | 368/6 |
| 4,310,890 A | 1/1982 | Trehn et al. | |
| 4,460,965 A | 7/1984 | Trehn et al. | |
| 4,812,805 A | 3/1989 | Lachat et al. | |
| 4,823,928 A | 4/1989 | Speas | |
| 4,825,425 A | 4/1989 | Turner | |
| 4,875,598 A | 10/1989 | Dahl | |
| 4,880,097 A | 11/1989 | Speas | |
| 4,895,238 A | 1/1990 | Speas | |
| 5,065,156 A | 11/1991 | Bernier | |
| 5,201,396 A | 4/1993 | Chalabian et al. | |
| 5,222,076 A | 6/1993 | Ng et al. | |
| 5,244,070 A | 9/1993 | Carmen et al. | |
| 5,273,151 A | 12/1993 | Carmen et al. | |
| 5,360,095 A | 11/1994 | Speas | |
| 5,426,363 A | 6/1995 | Akagi et al. | |
| 5,442,348 A * | 8/1995 | Mushell | G07F 17/246 |
| | | | 194/205 |
| 5,471,139 A * | 11/1995 | Zadoff | G01B 7/003 |
| | | | 250/227.14 |
| 5,563,491 A | 10/1996 | Tseng | |
| 5,614,892 A | 3/1997 | Ward, II et al. | |
| 5,617,942 A | 4/1997 | Ward, II et al. | |
| 5,640,002 A | 6/1997 | Ruppert et al. | |
| 5,642,119 A | 6/1997 | Jacobs | |
| 5,648,906 A | 7/1997 | Amirpanahi | |
| 5,659,306 A | 8/1997 | Bahar | |
| 5,710,743 A * | 1/1998 | Dee | G07F 17/24 |
| | | | 194/217 |
| 5,737,710 A | 4/1998 | Anthonyson | |
| 5,777,951 A | 7/1998 | Mitschele et al. | |
| 5,778,067 A | 7/1998 | Jones et al. | |
| 5,806,651 A | 9/1998 | Carmen et al. | |
| D400,115 S | 10/1998 | Yaron et al. | |
| 5,833,042 A | 11/1998 | Baitch et al. | |
| 5,841,369 A | 11/1998 | Sutton et al. | |
| 5,842,411 A | 12/1998 | Johnson | |
| 5,845,268 A * | 12/1998 | Moore | G06Q 30/0284 |
| | | | 705/418 |
| 5,852,411 A | 12/1998 | Jacobs et al. | |
| 5,954,182 A | 9/1999 | Wei | |
| 6,037,880 A | 3/2000 | Manion | |
| 6,078,272 A | 6/2000 | Jacobs et al. | |
| 6,081,205 A * | 6/2000 | Williams | B60L 3/0069 |
| | | | 235/381 |
| 6,111,522 A | 8/2000 | Hiltz et al. | |
| 6,116,403 A | 9/2000 | Kiehl | |
| 6,195,015 B1 | 2/2001 | Jacobs et al. | |
| D439,591 S | 3/2001 | Reidt et al. | |
| 6,229,455 B1 * | 5/2001 | Yost | G07F 17/24 |
| | | | 340/932.2 |
| 6,230,868 B1 | 5/2001 | Tuxen et al. | |
| D447,714 S | 9/2001 | Cappiello | |
| D449,010 S | 10/2001 | Petrucelli | |
| 6,309,098 B1 | 10/2001 | Wong | |
| 6,312,152 B2 | 11/2001 | Dee et al. | |
| RE37,531 E | 1/2002 | Chaco et al. | |
| D454,807 S | 3/2002 | Cappiello | |
| 6,373,422 B1 | 4/2002 | Mostafa | |
| D461,728 S | 8/2002 | Tuxen et al. | |
| 6,456,491 B1 | 9/2002 | Flannery et al. | |
| D463,749 S | 10/2002 | Petrucelli | |
| 6,457,586 B2 | 10/2002 | Yasuda et al. | |
| 6,505,774 B1 | 1/2003 | Fulcher et al. | |
| 6,559,776 B2 * | 5/2003 | Katz | G07B 15/02 |
| | | | 340/932.2 |
| 6,697,730 B2 | 2/2004 | Dickerson | |
| 6,747,575 B2 | 6/2004 | Chauvin et al. | |
| 6,812,857 B1 | 11/2004 | Kassab et al. | |
| 6,856,922 B1 | 2/2005 | Austin et al. | |
| 6,885,311 B2 | 4/2005 | Howard et al. | |
| 6,914,411 B2 | 7/2005 | Couch et al. | |
| 6,929,179 B2 | 8/2005 | Fulcher et al. | |
| 7,019,420 B2 | 3/2006 | Kogan et al. | |
| 7,019,670 B2 | 3/2006 | Bahar | |
| 7,023,360 B2 | 4/2006 | Staniszewski et al. | |
| 7,027,773 B1 | 4/2006 | McMillin | |
| 7,029,167 B1 | 4/2006 | Mitschele | |
| 7,183,999 B2 | 2/2007 | Matthews et al. | |
| 7,222,031 B2 | 5/2007 | Heatley | |
| 7,237,716 B2 | 7/2007 | Silberberg | |
| 7,388,349 B2 | 6/2008 | Elder et al. | |
| D575,168 S | 8/2008 | King et al. | |
| D587,141 S | 2/2009 | King et al. | |
| 7,748,620 B2 | 7/2010 | Gomez et al. | |
| 7,772,720 B2 | 8/2010 | McGee et al. | |
| 7,783,530 B2 | 8/2010 | Slemmer et al. | |
| 7,806,248 B2 | 10/2010 | Hunter et al. | |
| 7,825,826 B2 | 11/2010 | Welch et al. | |
| 7,854,310 B2 | 12/2010 | King et al. | |
| 7,855,661 B2 | 12/2010 | Ponert | |
| 7,933,841 B2 | 4/2011 | Schmeyer et al. | |
| D654,816 S | 2/2012 | MacKay et al. | |
| D656,046 S | 3/2012 | MacKay et al. | |
| 8,138,950 B1 | 3/2012 | Leung | |
| D661,603 S | 6/2012 | MacKay et al. | |
| 8,279,107 B2 | 10/2012 | Krstanovic et al. | |
| 8,395,532 B2 * | 3/2013 | Chauvin | G06Q 20/32 |
| | | | 340/928 |
| 8,479,909 B2 | 7/2013 | King et al. | |
| 8,513,832 B2 | 8/2013 | Hunter et al. | |
| 8,566,159 B2 | 10/2013 | King et al. | |
| D692,784 S | 11/2013 | Anderssen et al. | |
| 8,590,687 B2 | 11/2013 | King et al. | |
| 8,595,054 B2 | 11/2013 | King et al. | |
| 8,631,921 B2 | 1/2014 | Jones et al. | |
| 8,684,158 B2 * | 4/2014 | Jones | G07B 15/02 |
| | | | 194/215 |
| D705,090 S | 5/2014 | MacKay et al. | |
| D707,140 S | 6/2014 | King et al. | |
| D707,141 S | 6/2014 | King et al. | |
| D707,142 S | 6/2014 | King et al. | |
| 8,749,403 B2 | 6/2014 | King et al. | |
| 8,770,371 B2 | 7/2014 | MacKay et al. | |
| 8,862,494 B2 | 10/2014 | King et al. | |
| 8,884,785 B2 | 11/2014 | Groft et al. | |
| 9,002,723 B2 | 4/2015 | King et al. | |
| 9,047,712 B2 | 6/2015 | King et al. | |
| 9,127,964 B2 * | 9/2015 | Schwarz | G01D 4/002 |
| D749,000 S | 2/2016 | King et al. | |
| D750,513 S | 3/2016 | King et al. | |
| D756,807 S | 5/2016 | King et al. | |
| D756,808 S | 5/2016 | King et al. | |
| 9,391,474 B2 | 7/2016 | Hunter et al. | |
| 9,424,691 B2 | 8/2016 | King et al. | |
| 9,489,776 B2 | 11/2016 | Kell et al. | |
| 9,508,198 B1 | 11/2016 | King et al. | |
| 9,661,403 B2 | 5/2017 | King et al. | |

(56) References Cited

U.S. PATENT DOCUMENTS

| | | |
|---|---|---|
| 9,685,027 B2 | 6/2017 | King et al. |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0111768 A1* | 8/2002 | Ghorayeb ............ G07B 15/02 |
| | | 702/178 |
| 2003/0092387 A1 | 5/2003 | Hjelmvik |
| 2003/0112597 A1 | 6/2003 | Smith |
| 2003/0121754 A1 | 7/2003 | King |
| 2003/0128010 A1 | 7/2003 | Hsu |
| 2003/0128136 A1 | 7/2003 | Spier et al. |
| 2003/0140531 A1 | 7/2003 | Pippins |
| 2003/0144972 A1 | 7/2003 | Cordery et al. |
| 2003/0169183 A1* | 9/2003 | Korepanov ............ G07F 17/246 |
| | | 340/932.2 |
| 2003/0179107 A1 | 9/2003 | Kibria et al. |
| 2003/0220835 A1 | 11/2003 | Barnes et al. |
| 2003/0222792 A1* | 12/2003 | Berman ................ G07B 15/02 |
| | | 340/932.2 |
| 2004/0068434 A1 | 4/2004 | Kanekon |
| 2004/0084278 A1 | 5/2004 | Harris et al. |
| 2004/0094619 A1 | 5/2004 | Silberberg |
| 2004/0181496 A1 | 9/2004 | Odinotski et al. |
| 2004/0254840 A1 | 12/2004 | Slemmer et al. |
| 2004/0264302 A1 | 12/2004 | Ward |
| 2005/0040951 A1 | 2/2005 | Zalewski et al. |
| 2005/0099320 A1 | 5/2005 | Nath et al. |
| 2005/0178639 A1 | 8/2005 | Brumfield et al. |
| 2005/0192911 A1 | 9/2005 | Mattern |
| 2005/0226201 A1 | 10/2005 | McMillin et al. |
| 2006/0021848 A1 | 2/2006 | Smith |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0267799 A1 | 11/2006 | Mendelson |
| 2007/0016539 A1 | 1/2007 | Groft et al. |
| 2007/0040449 A1 | 2/2007 | Spurlin et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0136128 A1 | 6/2007 | Janacek et al. |
| 2007/0184852 A1 | 8/2007 | Johnson et al. |
| 2007/0210935 A1* | 9/2007 | Yost .................. G07B 15/02 |
| | | 340/932.2 |
| 2007/0285281 A1* | 12/2007 | Welch .................. G07B 15/02 |
| | | 340/932.2 |
| 2008/0052254 A1 | 2/2008 | Al et al. |
| 2008/0071611 A1 | 3/2008 | Lovett |
| 2008/0093454 A1 | 4/2008 | Yamazaki et al. |
| 2008/0147268 A1 | 6/2008 | Fuller |
| 2008/0208680 A1 | 8/2008 | Cho |
| 2008/0238715 A1 | 10/2008 | Cheng et al. |
| 2009/0109062 A1 | 4/2009 | An |
| 2009/0183966 A1 | 7/2009 | King et al. |
| 2009/0192950 A1 | 7/2009 | King et al. |
| 2009/0267732 A1 | 10/2009 | Chauvin et al. |
| 2009/0284907 A1 | 11/2009 | Regimbal et al. |
| 2009/0315720 A1 | 12/2009 | Clement et al. |
| 2010/0106517 A1 | 4/2010 | Kociubinski et al. |
| 2010/0188932 A1 | 7/2010 | Hanks et al. |
| 2010/0332394 A1 | 12/2010 | Ioli |
| 2011/0057815 A1* | 3/2011 | King ................. G07B 15/02 |
| | | 340/932.2 |
| 2011/0060653 A1* | 3/2011 | King ................. G06Q 30/02 |
| | | 705/14.58 |
| 2011/0063133 A1 | 3/2011 | Keller et al. |
| 2011/0313822 A1* | 12/2011 | Burdick ............. G06Q 30/02 |
| | | 705/13 |
| 2011/0320243 A1 | 12/2011 | Khan et al. |
| 2012/0084210 A1 | 4/2012 | Farahmand |
| 2012/0158466 A1 | 6/2012 | John |
| 2012/0222935 A1 | 9/2012 | MacKay et al. |
| 2012/0285790 A1* | 11/2012 | Jones ................. G07B 15/02 |
| | | 194/217 |
| 2012/0285791 A1* | 11/2012 | Jones ................. G07B 15/02 |
| | | 194/217 |
| 2012/0285792 A1* | 11/2012 | Jones ................. G07B 15/02 |
| | | 194/217 |
| 2012/0285793 A1 | 11/2012 | Jones et al. |
| 2012/0286036 A1 | 11/2012 | Jones et al. |
| 2012/0292385 A1 | 11/2012 | MacKay et al. |
| 2013/0005445 A1 | 1/2013 | Walker et al. |
| 2013/0027218 A1* | 1/2013 | Schwarz ............ G01D 4/002 |
| | | 340/870.02 |
| 2013/0099943 A1 | 4/2013 | Subramanya |
| 2013/0116952 A1 | 5/2013 | Chai |
| 2014/0040028 A1 | 2/2014 | King et al. |
| 2014/0108107 A1* | 4/2014 | Jones ................. G07B 15/02 |
| | | 705/13 |
| 2014/0129158 A1 | 5/2014 | Shea |
| 2014/0174881 A1 | 6/2014 | King et al. |
| 2014/0210646 A1 | 7/2014 | Subramanya |
| 2014/0214499 A1 | 7/2014 | Hudson et al. |
| 2014/0214500 A1 | 7/2014 | Hudson et al. |
| 2014/0229246 A1 | 8/2014 | Ghaffari |
| 2014/0289025 A1 | 9/2014 | King et al. |
| 2015/0084786 A1 | 3/2015 | King et al. |
| 2015/0106172 A1 | 4/2015 | Salama |
| 2015/0332587 A1 | 11/2015 | Schwarz et al. |
| 2016/0321714 A1 | 11/2016 | King et al. |
| 2017/0098339 A1 | 4/2017 | Keller et al. |
| 2018/0025549 A1 | 1/2018 | King et al. |

FOREIGN PATENT DOCUMENTS

| | | | |
|---|---|---|---|
| EP | 0329129 A2 * | 8/1989 | ........... G07F 17/246 |
| EP | 0329129 A2 | 8/1989 | |
| EP | 0980055 B1 | 9/2001 | |
| EP | 1128350 B1 | 10/2007 | |
| FR | 2837583 A1 | 9/2003 | |
| IL | 149880 A | 6/2007 | |
| JP | S5259000 A | 5/1977 | |
| JP | S58121494 A | 7/1983 | |
| JP | 2002099640 A | 4/2002 | |
| JP | 2005267430 A | 9/2005 | |
| KR | 20050038077 A | 4/2005 | |
| WO | WO-2005031494 A2 | 4/2005 | |
| WO | WO-2006095352 A2 | 9/2006 | |
| WO | WO-2009154787 A2 | 12/2009 | |
| WO | WO-2014014494 A1 | 1/2014 | |

OTHER PUBLICATIONS

Co-pending U.S. Appl. No. 15/443,734, filed Feb. 27, 2017.

Co-pending U.S. Appl. No. 15/474,773, filed Mar. 30, 2017.

Decision Denying Institution of Inter Partes Review dated Mar. 30, 2016 of U.S. Pat. No. 7,854,310. IPR Case No. IPR2016-00068.

Decision Denying Inter Partes Review dated Apr. 1, 2016 of U.S. Pat. No. 8,595,054. IPR Case No. IPR2016-00069.

Decision Denying Inter Partes Review dated Apr. 1, 2016 of U.S. Pat. No. 8,595,054. IPR Case No. IPR2016-00070.

Decision Instituting Inter Partes Review dated Mar. 30, 2016 of U.S. Pat. No. 7,854,310. IPR Case No. IPR2016-00067.

Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.

Final Written Decision of U.S. Pat. No. 7,854,310. IPR Case No. IPR2016-00067 dated Mar. 27, 2017.

Flatley. In San Francisco, Hackers Park for Free. Read filed under Misc. Gadgets, downloaded from www.engadget.com website on May 3, 2010, originally posted on Jul. 31, 2009, 5 pages.

Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.

(56) References Cited

OTHER PUBLICATIONS

Meter Solutions, Single-Space Meters brochure, downloaded from www.duncansolutions.com website, revised Apr. 2006, 2 pages.
PCT/IB2006/054574 International Preliminary Report on Patentability dated Mar. 10, 2009.
PCT/IB2006/054574 International Search Report dated Oct. 27, 2008.
PCT/US2010/047906 International Preliminary Report on Patentability dated Mar. 6, 2012.
PCT/US2010/047906 International Search Report dated Mar. 30, 2011.
PCT/US2010/047907 International Preliminary Report on Patentability dated Mar. 15, 2012.
PCT/US2010/047907 International Search Report dated Apr. 26, 2011.
PCT/US2012/048190 International Search Report dated Jan. 22, 2013.
Petition for Inter Partes Review of U.S. Pat. No. 7,854,310. IPR Case No. IPR2016-00067, filed Oct. 22, 2015.
Petition for Inter Partes Review of U.S. Pat. No. 7,854,310. IPR Case No. IPR2016-00068, filed Oct. 22, 2015.
Petition for Inter Partes Review of U.S. Pat. No. 8,595,054. IPR Case No. IPR2016-00069, filed Oct. 22, 2015.
Spyker et al. Predicting Capacitor Run Time for a Battery/Capacitor Hybrid Source. Power Electronic Drives and Energy Systems for Industrial Growth. 1998. Proceedings. 1998 IEEE International Conference, pp. 809-814.
The U.S. Conference of Mayors Presents 'Best Practice' Awards, Los Angeles, New Orleans, Elizabeth, N.J. and Long Beach, CA Honored for Excellence & Innovation in Public-Private partnerships, Press Release Jan. 20, 2012.
Tung. Design of an advanced on-street parking meter. RIT Scholar Works. Thesis/Dissertation Collections (2001).

\* cited by examiner

LOW-POWER VEHICLE DETECTION

RELATED APPLICATIONS

This application claims priority to U.S. Provisional Patent Application No. 61/511,484, filed Jul. 25, 2011, which is hereby incorporated in its entirety and for all purposes.

BACKGROUND

Solar and/or battery powered parking systems such as single-space or multi-space meters for vehicles can employ parking meters with vehicle detection systems that detect the presence of a vehicle in a parking space. Time paid for parking in the space can then be dependent on the space being occupied by a vehicle. One technique for detecting the presence of a vehicle is to use a magnetometer located in the parking space. A magnetometer can be advantageous because it has relatively low power requirements, and often can be suitably powered by a battery. A magnetometer must be located close to the vehicle that will occupy the parking space, for accurate detection without false indications. Placement of a magnetometer in a parking space typically requires coring of the surface asphalt or concrete (i.e., drilling a cylindrical opening or shaft) for embedding the magnetometer in the adjacent street or sidewalk area. This can be a very labor intensive and relatively expensive proposition.

Alternatively, a magnetometer could be included in a parking meter of the parking space, which would avoid the surface coring and embedding of the magnetometer. This placement will usually decrease the accuracy of detection, because magnetometers possess no directional detection capability. Because of the directional deficiency, a magnetometer installed in a meter potentially could not distinguish between a vehicle parked in the space associated with the parking meter and a vehicle parked in an adjacent parking space, or could not distinguish between a vehicle parked in the space and a vehicle stopped in the street.

Other vehicle detection systems have employed ultrasonic or infrared systems internal to a parking meter. Such systems send out a known ultrasonic or infrared signal and evaluate vehicle presence based on partial reflection of the signal, or lack thereof. The signal can be modulated for improved accuracy of detection. Because parking meters, especially single-space parking meters, usually have a limited power budget, these ultrasonic and infrared systems are designed to be operated at relatively low power levels. Unfortunately, low-power ultrasonic and infrared systems are often prone to signal interference, due to pedestrian traffic, rain, snow, wind, and the like, and can have very narrow angles of detection. Accuracy of detection can be improved by increased signal power. Moreover, ultrasonic and infrared systems typically require a relatively large percentage of the transmitted signal to be reflected back for detecting the presence of a vehicle. Receiving a reflected signal that constitutes a large percentage of the transmitted signal can be problematic, given weather conditions and pedestrian traffic, and therefore ultrasonic and infrared systems can be inherently unreliable as a means for detecting the presence of a vehicle in a parking space.

Other vehicle detection systems that potentially could be more accurate than low-power magnetometers, ultrasonic systems, and infrared systems, include cameras, passive infrared systems (such as used in automatic door openers), active infrared detection, and radar. These other systems, while possibly providing very accurate detection of a vehicle in a parking space, typically use more power than can be provided by a battery, solar cell, or other low-power system of a battery and/or solar powered parking meter such as the single space meter described below. For example, radar can be very difficult to utilize because of power management issues, and often provides relatively unpredictable results.

It should be apparent that accurate vehicle detection systems either require extensive installation and/or maintenance costs, as with embedded magnetometer systems, or are very inaccurate when placed a distance away from the object to be detected, or use too much power for a single-space parking meter in order to be suitable. In addition, a directional sensor that is placed in the space to be monitored or external to a meter pole, may become compromised by dirt or debris, or may fall victim to tampering. What is needed is a more reliable, low power vehicle detection system for use in a solar and/or battery powered parking meter. The present invention satisfies this need.

SUMMARY

A parking meter detects an object in proximity, based on a change in a proximity measurement at the meter, activates a directional sensor in response to detecting the object, receives sensor data at a meter processor from the directional sensor, wherein the received sensor data indicates a predetermined direction to the detected object relative to the meter. The parking meter determines a presence of the object, or lack thereof, in the predetermined direction based on the sensor data, and upon a positive determination of the presence of the object, stores an indication of the presence of the object along with a time of the positive determination.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The invention is now described, by way of a non-limiting example, with reference to the accompanying drawings, where like reference numerals refer to like objects, and in which.

DETAILED DESCRIPTION

Figure 1A:
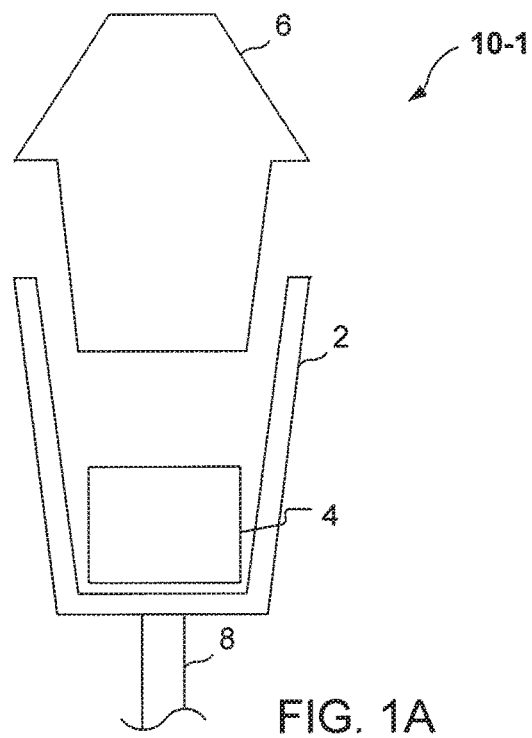
FIGS. 1A, 1B, and 1C are schematic illustrations of embodiments of single space parking meters.

A parking meter for a parking space associated with the parking meter utilizes a proximity sensor to detect an object in proximity to the parking space and in response activates a directional sensor to detect the presence and direction of the object, such as a motor vehicle. The proximity sensor is a low-power sensor that can detect an object in proximity to the sensor, but generally has insufficient sensitivity and precision to identify the presence and direction of the object. For example, a low-power proximity sensor comprising a magnetometer can detect if a metallic object is in proximity to the magnetometer, but is generally incapable of detecting the direction in which the metallic object is located in relation to the magnetometer. The directional sensor typically draws more power than the proximity sensor and can comprise a sensor such as, but not limited to, an infrared, passive infrared, radar, or optical sensor, which is capable of determining the presence of an object in a specific direction relative to the higher-powered directional sensor. Such directional sensors typically require greater power for operation than can be supplied continuously or periodically by a typical power-limited device such as a single space parking meter. In accordance with the disclosure, the low-power proximity sensor can comprise a magnetometer, which is used as a trigger to activate the directional sensor to receive sensor data. The directional sensor data is analyzed to determine whether or not an object detected by the low-power sensor is located in a specific location associated with the directional sensor. This construction permits the use of a relatively higher power directional sensor having greater accuracy, such that the directional sensor can be activated only when needed, as indicated by the low-power sensor. This eliminates the need for providing continuous or periodic power to the higher power directional sensor.

In another aspect, after the directional sensor has verified the presence of an object of interest, the magnetic signature captured by the low-power sensor magnetometer can be inverted and used to determine the departure of the object of interest from the parking space. The departure indication can be used to reset any time remaining on the parking meter to zero or to some other desired amount of remaining time In FIG. 1A, an embodiment of a single space parking meter in accordance with this disclosure is designated generally by the reference numeral 10-1. The parking meter 10-1 includes a location housing 2, a cash collection box 4, and a meter unit 6. The location housing 2 is fixedly attached to a pole 8 associated with a parking space at a geographic location, with the cash collection box 4 and the meter unit 6 being received in the location housing. The meter unit 6 is a removable meter unit that can be replaced independently of other components of the meter 10-1 such as the housing 2 and cash collection box 4. The cash collection box 4 is also removable and can also be replaced independently of the other meter components.

Figure 1B:
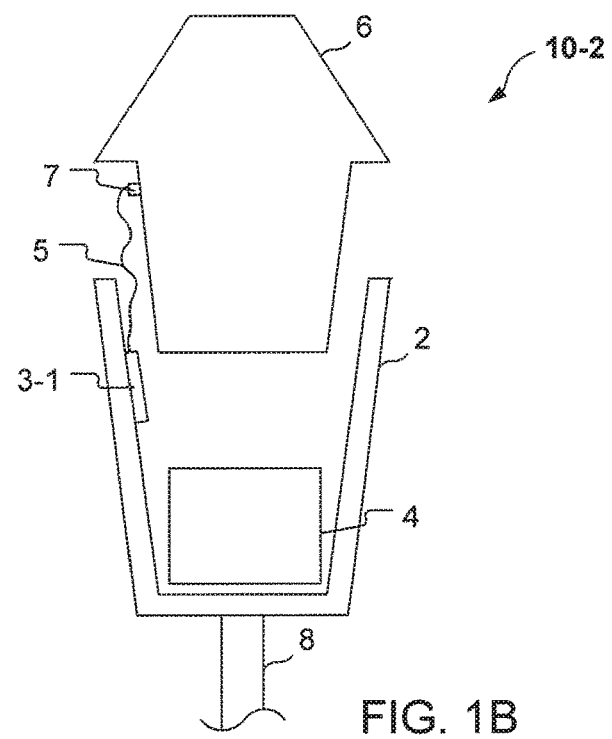

In FIG. 1B, another embodiment of a single space parking meter is designated generally by the reference numeral 10-2. The parking meter 10-2 includes the location housing 2, the cash collection box 4, the meter unit 6, and an auxiliary device 3-1 in the form of a tag. The cash collection box 4, the meter unit 6, and the tag 3-1 are received within the housing 2. The housing 2 is fixedly attached to the pole 8. The tag 3-1 is permanently attached to an inner surface of the housing 2. Attachment to an inner surface shields the tag from the outside environment and helps prevent damage and vandalism to the tag. The cash collection box 4 and meter unit 6 are removable and replaceable. In the example shown in FIG. 1B, the tag 3-1 is connectable to the meter unit 6 by means of a length of wire 5 and a plug-in connector 7 at the meter unit, and can be powered by the meter unit (e.g., by a battery, solar cell, or other power source associated with the meter unit). The tag 3-1 is useful for associating the collection box 4 and meter unit 6 with the location.

Figure 1C:
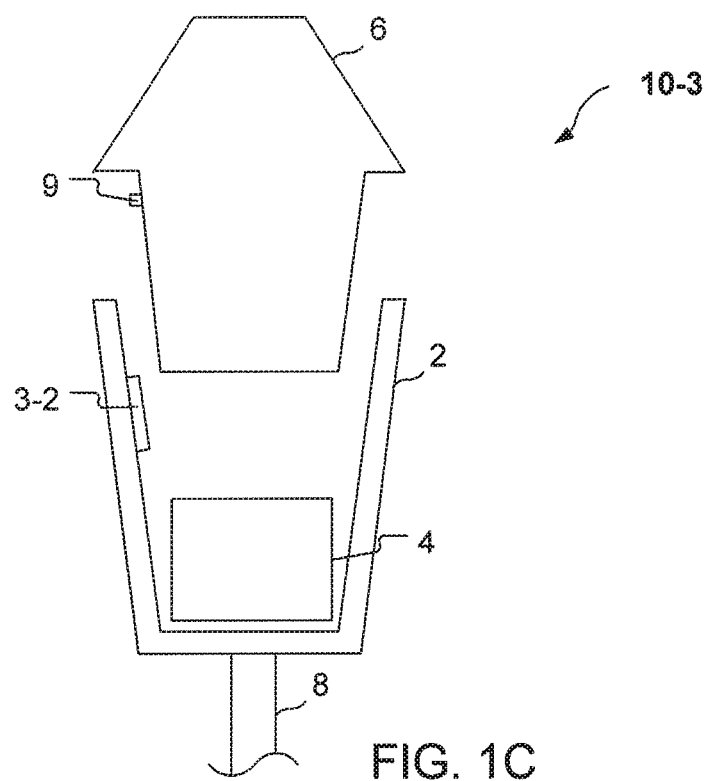

Referring to FIG. 1C, another embodiment of a single space parking meter is designated generally by the reference numeral 10-3. The parking meter 10-3 is similar to the parking meter 10-2 of FIG. 1B except that the parking meter 10-3 includes a wireless tag 3-2 and the meter unit 6-2 includes a wireless transceiver 9. The wireless tag 3-2 communicates wirelessly with the meter unit and can be, for example, an RFID tag, a smart card, an ID token, or the like. The wireless transceiver 9 receives information from the tag 3-2 and, for example, can be a radio transceiver that uses passive RFID technology, WiFi, Bluetooth, WiMax, or other short range wireless radio technology, in accordance with the wireless communication channel used by the tag.

The wireless transceiver 9 of the parking meter 10-3 may be an infrared (IR) transceiver that emits an infrared beam for data communication. In that case, the transceiver 9 is aligned with the tag 3-2 such that the infrared beam of the transceiver is properly targeted at the tag 3-2.

In one embodiment, the wired tag 3-1 or the wireless tag 3-2 is used to monitor the content of the cash collection box 4. Each tag 3 has a unique identifier that identifies the parking meter 10 with which it is used, and that is associated with a unique physical location where the parking meter is fixedly located, e.g., the location of the pole 8 and the location housing 2. Each tag 3 has a unique ID which is transmitted to the central management system. The ID is logically connected in the management system's database to that meter pole 8 and location specific settings. Therefore, the removable parking meter unit 6 may receive the correct hours of operation, rate tables, and other location-specific data related to that meter pole 8 associated with a specific parking space.

The embodiment of the location housing 2 in FIGS. 1A, 1B, and 1C is a single or dual space type of housing that is affixed to the pole 8 and is configured to mate with a removable meter unit 6. In other embodiments, however, the location housing 2 can be a cabinet or other enclosed space that is configured to mate with one or more removable meter units, where the removable meter units are configured to be mated in compartments or sockets of the cabinet, such that each of the compartments is associated with a physical location that is not necessarily at the same location as the cabinet or the compartment. In other embodiments, the location housing can be another type of receptacle fixedly placed and associated with a physical location.

Figure 2A:
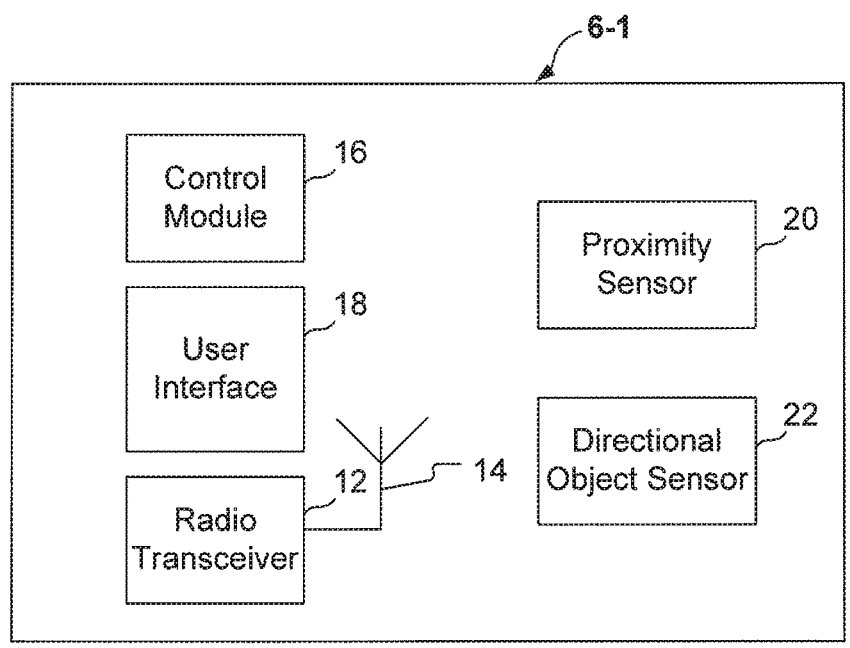
FIG. 2A shows a functional block diagram of a removable meter unit used in the parking meter of FIG. 1A.

FIG. 2A is a functional block diagram of a removable meter unit that can be used in the meter 10-1 of FIG. 1A and is designated generally by reference numeral 6-1. The removable meter unit 6-1 includes a radio transceiver 12, an antenna 14, a control module 16, a user interface 18 through which payment can be received, a proximity sensor 20, and a directional object sensor 22. The proximity sensor 20 is a low-power, non-directional, omnidirectional or multi-directional sensor such as a magnetometer, an optical sensor, a pressure sensor, an ultrasonic sensor, or the like, comprising a low-power sensor. As indicated above, the parking meter 10 is self-powered and, as described more fully below, uses the proximity sensor 20 and the directional object sensor 22 to detect a presence of a vehicle in a parking spot associated with the parking meter 10-1 and operates under control of the control module 16. Optionally, the directional object sensor 22 may be located outside the meter unit 6-1 and wirelessly connected to the meter unit 6-1 using a low power radio link. For example, a directional object sensor may be placed on the pole 8 or on another pole or similar object.

The control module 16 includes one or more processors such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof. The control module 16 also includes one or more storage mediums. A storage medium can include one or more memories for storing data, including read only memory (ROM), random access memory (RAM), magnetic RAM, core memory, magnetic disk storage mediums, optical storage mediums, flash memory devices and/or other machine readable mediums for storing information.

The user interface 18 provides a means for a location user to interact with the meter unit 6-1 and can include, for example, a display, one or more lights, and a keypad. The user interface 18 can provide a payment interface including a currency receiver for receiving coins and/or bills from a user in payment for using the parking location, as well as a reader for processing credit cards, debit cards, payment tokens, or proximity cards like Paywave™ and Paypass™ or NFC solutions like Google Wallet™ and the like. The control module 16 is coupled to the user payment interface and is configured to receive payment information regarding the amount of a payment and/or card or token information received at the payment interface. The control module 16 communicates the payment information from the user interface 18, via the radio transceiver 12, with the remote data manager. The one or more lights of the user interface 18 can be used as an indicator as to the payment status or, as discussed further below, can be used to produce an indication that a parking space that is associated with the location of the meter 10 is occupied.

In this example, the low-power sensor comprising the proximity sensor 20, and the directional sensor 22, are located within or attached to the removable meter unit 6 of the parking meter 10-1. Alternatively, the proximity sensor 20 and the directional sensor 22 could be located on another portion of the meter 10-1 and/or could be located on the pole 8. The proximity sensor 20 is coupled to the control module 16 and communicates a trigger signal to the control module 16 when a proximity measurement exceeds a threshold level. Upon receiving the trigger signal from the proximity sensor 20 the control module 16 wakes up the directional object sensor 22 such that the directional object sensor 22 can verify if an object is not only located near the parking meter 10-1, but is located within a parking space associated with the parking meter 10-1. The directional object sensor 22 can be an optical sensor (e.g., a digital camera), a passive infrared sensor, a radar sensor, an active infrared sensor, or the like.

Figure 2B:
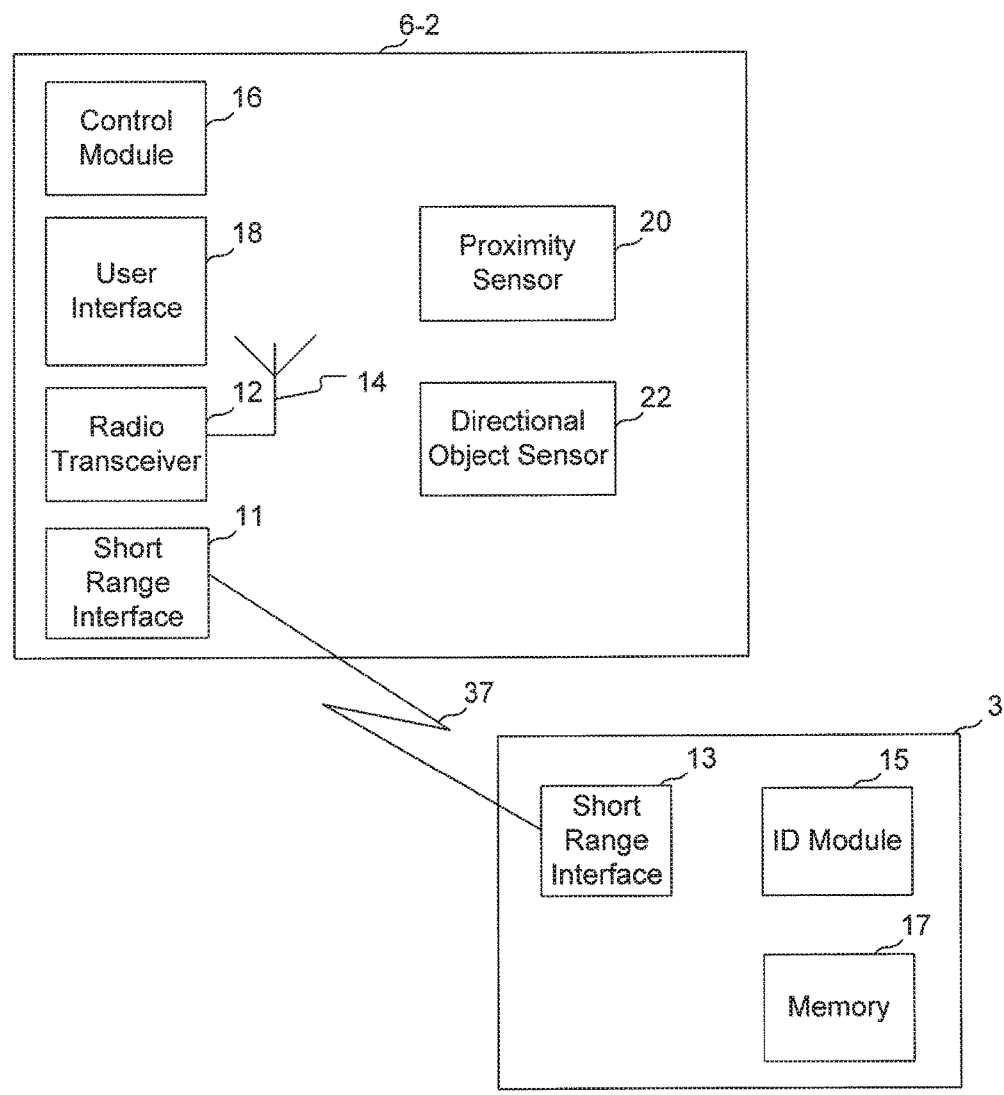
FIG. 2B shows a functional block diagram of a removable meter unit and a tag device used in the parking meters of FIGS. 1B and 1C.

FIG. 2B shows functional block diagrams of an exemplary removable meter unit 6-2 and a tag 3 that can be used in meters such as the meters 10-2 and 10-3 of FIGS. 1B and 1C. The meter unit 6-2 includes similar components to the meter unit 6-1 in FIG. 2A, including the radio transceiver 12, the antenna 14, the control module 15, the user interface 18, the proximity sensor 20 and the directional object sensor 22. In addition, the meter unit 6-2 also includes a short range interface 11 by means of which it communicates with the tag 3. The tag 3 has a short range interface 13, an ID module 15, and an optional memory module 17 for storing information regarding operating parameters including a payment collection history and/or configuration settings. The ID module 15 stores a unique identifier, e.g., a serial number, that is associated with the tag 3.

The meter unit 6-2 is linked to the tag 3 for data communications by a link 37. In the case where the tag 3 is a wired tag 3-1, the link 37 is the wire 5 (see FIG. 1B). In the case where the tag 3 is a wireless tag 3-2, the link 37 can be a radio link or an optical link (FIG. 2B). In the case of a wireless tag 3-2, the short range interfaces 11 and 13 can be any type of near-field communication (NFC) devices such as, for example, RFID devices, Bluetooth devices, WiFi devices, IR devices, and the like.

The proximity sensor 20 and the directional sensor 22 operate similarly in the meter unit 6-2 as in the meter unit 6-1 described above. In an alternative arrangement, not shown, the proximity sensor 20 and/or the directional object sensor 22 can be co-located with the housing 2, the tag 3, the cash box 4 or the pole 8. In these arrangements, the proximity sensor 20 and/or the directional object sensor 22 can be coupled to the short range interface 13 of the tag 3 or to another short range interface so as to communicate detection signals to the control module 16.

In one embodiment, the control module 16 communicates the payment information, via the link 37, to the short range interface 13 of the tag 3. The short range interface 13 then updates the optional memory module 17 based on the received payment information. The memory module 17 can add the amount of currency indicated to have been received by the received payment information to the stored amount. This is useful when the meter unit 6 is swapped for maintenance reasons as thereby coin counts can be transferred to the replacement meter unit and the coin audit reliability is maintained. In addition, the memory module 17 can also receive and store transaction-time information including the date and time of day that the payment was received. In one aspect of this embodiment, the control module 16 communicates time of day information of when a vehicle enters and leaves a parking spot, as detected by the proximity sensor 20 and the directional object sensor 22, to the tag 3.

Figure 3:
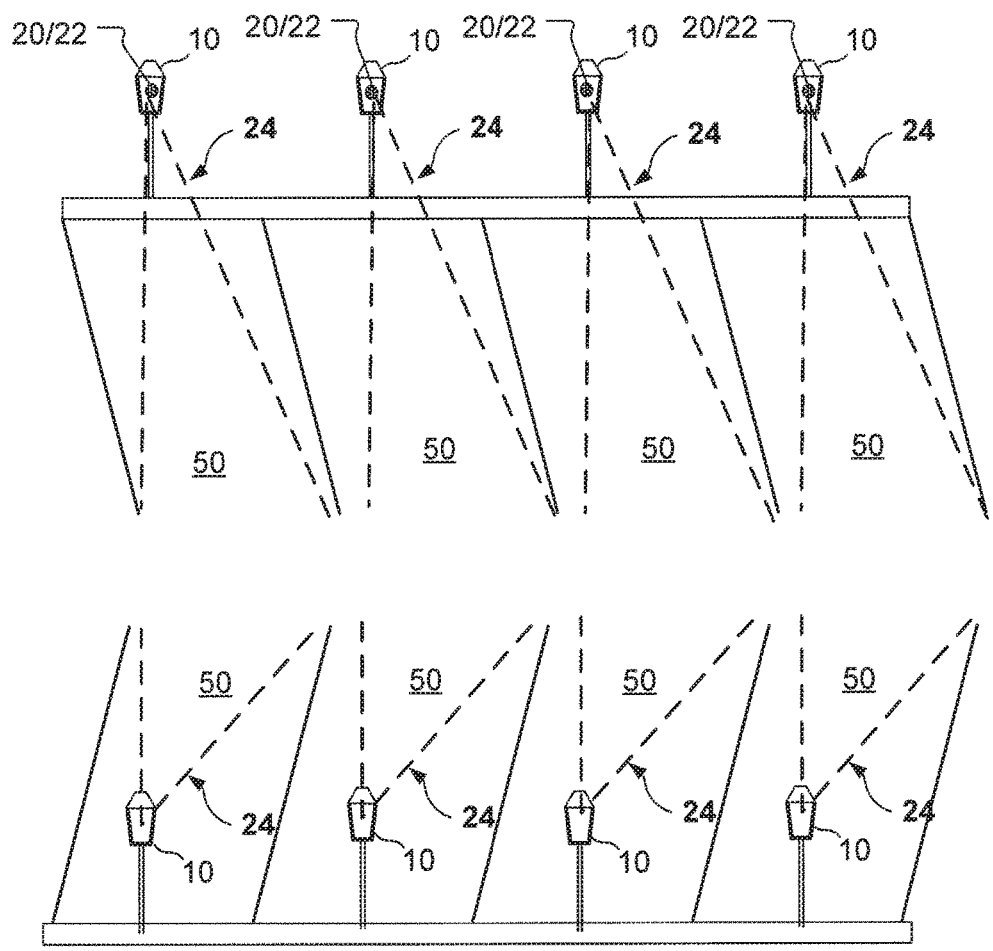
FIG. 3 shows an example of a local group of parking meters that employ a low power vehicle detection system in accordance with the disclosure.

FIG. 3 shows an example configuration of a group of parking meters 10 equipped with the proximity sensor 20 and the directional object sensor 22 and positioned near single-space parking spaces 50. The parking spaces 50 in this example are diagonal pull-in spaces, as indicated by the solid lines angled from the lateral lines indicating a curb or street edge. The directional object sensor 22 in each of the respective meters 10 is positioned and calibrated such than an object such as a vehicle that moves into a position in proximity to the meter will enter a space within a directional cone 24 indicated by dashed lines. The directional cone 24 is a space that is projected outwardly from the associated parking meter 10 and towards the specific parking space 50 associated with the parking meter 10 and with which the directional object sensor 22 is associated. An object, such as a vehicle, that enters the area of the directional cone 24 will be detected, first by the low-power proximity sensor 20, which detects the presence of the object of interest, and which then triggers the higher power directional object sensor 22. The directional object sensor 22 receives power sufficient to make a determination for confirming the presence of a vehicle in the parking space 50.

Figure 4:
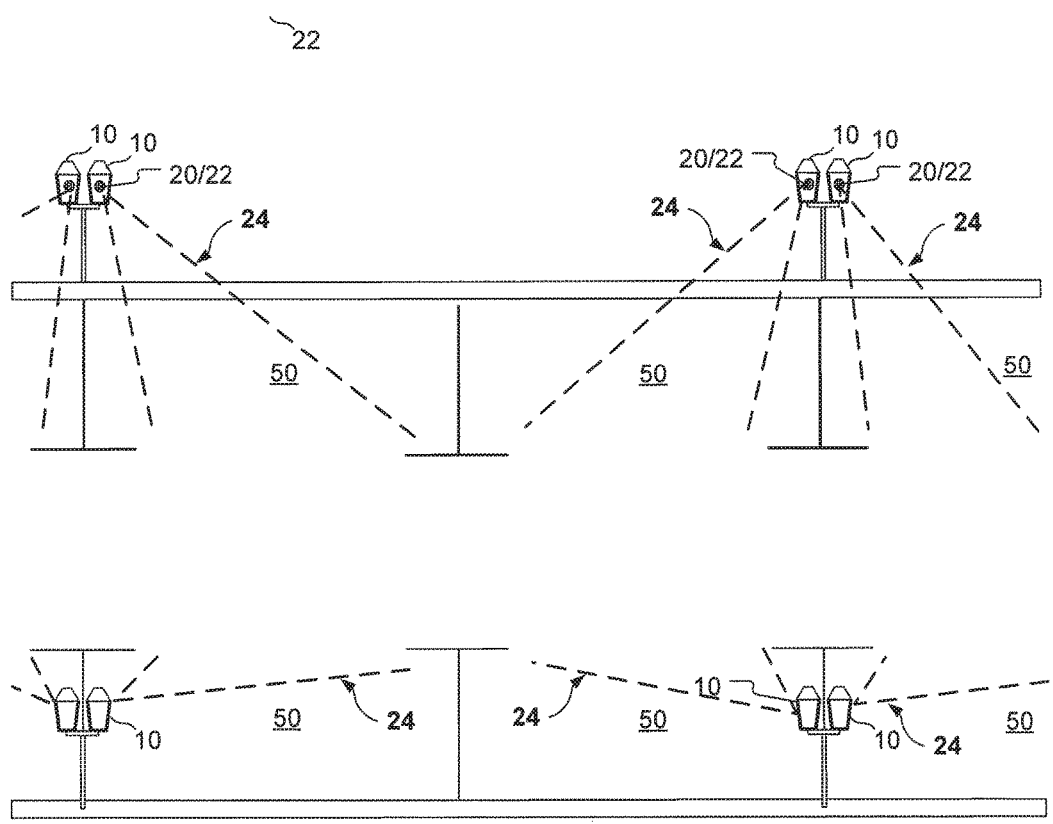
FIG. 4 shows another example of a local group of parking meters that employ a low power vehicle detection system in accordance with the disclosure.

FIG. 4 shows another example configuration of a group of parking meters 10 equipped with the proximity sensor 20 and the directional object sensor 22, where the meters 10 are positioned near parallel parking spaces 50. That is, the parallel parking spaces are oriented parallel to the lateral curb or road edge depicted in FIG. 4. The directional cones 24 can be calibrated digitally by setting directional gains to enhance signals within predetermined areas for the detection of objects of interest, such as vehicles attempting to park. Alternatively, the directional object sensors 22 could be positioned and/or shielded to produce the desired directional cone 24.

A process for operating a parking meter 10 equipped with a low-power sensor 20 such as a proximity sensor and a directional sensor 22 can comprise the following operations (not necessarily in the order listed):

1. detecting an object in proximity to a parking meter with a low-power sensor coupled to the parking meter; if, for example, the low-power sensor is a magnetometer, then the object is detected based on a change in a magnetic field at the meter;
2. in response to the trigger event, activating a directional sensor;
3. receiving sensor data at the directional sensor from a predetermined direction relative to the meter;
4. determining a presence of an object, or lack thereof, in the predetermined direction based on the received sensor data; and
5. upon a determination of the presence of the object, storing an indication of the presence of the object along with a time of the determined presence.

A threshold change in the magnetic field that results in detection of the object can be determined empirically. A time threshold can also be used (if change in magnetic field lasts for more than a threshold time). The magnetic field threshold and the time threshold can vary on the configuration of the parking space and the orientation of the parking meter. The sensitivity and directional gains, which can be used to tune the aim of the directional sensor, can also be determined empirically. Adaptive algorithms could be used to fine-tune the time threshold, the proximity sensor detection levels and the directional gains associated with the directional sensor.

Determining the presence of the object based on the received sensor data can include determining a confidence measure and/or a margin of error measure. For example, if the directional sensor is an ultrasonic sensor, the ultrasonic sensor receives an echo representative of a size and distance of the object. A valid vehicle detect status may be, for example, an echo from a large object at a distance between 3.0 feet and 9.0 feet. A large object at 5.0 feet would be in the middle of the expected parameters and would have a higher confidence or a smaller margin of error than a smaller object at, for example, 3.0 feet. Similarly visual detection could evaluate the size and position of the object against an expected vehicle size. The meter can vary subsequent actions depending on the confidence measure and/or the margin of error measure. For example, the meter may only report a parking violation if the vehicle presence detection is above an 80% confidence value.

In addition to detecting the object in proximity to the parking meter, the low-power proximity sensor could be used to detect when the object subsequently departs the proximity of the parking meter. For example, if the proximity sensor is a magnetometer, the control module could determine a change in magnitude of the magnetic field from a baseline value, where the baseline value is a value indicative of no object being in proximity to the parking meter. The magnetometer measurement can be a one, two, or three degrees-of-freedom (DOF) measurement that includes direction(s). Subsequent to the initial change in magnitude and direction of the magnetic field, the control module can detect an opposite change in magnitude and direction of the magnetic field and determine that the object has departed the proximity of the parking meter.

In embodiments that use a magnetometer, a baseline measurement can be determined as follows. A three DOF magnetometer returns a vector, (x, y, z), that represents the magnetic field around the meter. The baseline measurement represents an expected measurement vector (along x, y, z axes) when no vehicle is present in proximity to the meter. The baseline condition can be time-adapted to absorb a change in the environmental magnetic field or a shift in the measurement offset. Occasionally, the baseline measurement is not set or has drifted beyond a tracking window. In that case, it is beneficial to automatically determine a new baseline value without knowing when a vehicle is absent or present. The traditional way of doing this is to have a person visit the parking site and command the meter to determine a new baseline when no vehicle is present. This is time-consuming, especially in areas where there is a high occupancy rate and one must wait for a vehicle to depart.

An alternative way of determining a new baseline measurement when no vehicle is present is to have the control module of the meter receive the (x, y, z) measurements from the magnetometer after each step-change in readings. The (x, y, z) measurements are stored in a memory coupled to the control module. When sufficient measurements are captured over a minimum time period, the measurement data is analyzed to find a single cluster of readings. Because each vehicle has a different magnetic signature, the magnetic field measurement values obtained when one or more vehicles are present in proximity to the meter will be scattered substantially across the (x, y, z) space. The baseline measurements that correspond to no vehicles being present should generally be in a single cluster group in the (x, y, z) space. The center of the clustered measurements is determined and used as the new baseline measurement. That is, an object can be detected by comparing the proximity measurement to a baseline measurement, wherein the baseline measurement represents an expected proximity measurement when the object is not present, such that the object is deemed to be positively detected if the proximity measurement differs from the baseline measurement by more than a threshold value. The threshold value can be set depending on the environmental factors of the installation and types of vehicles to be detected.

The parking meter 10 described above includes a low-power proximity sensor 20 and a separate directional sensor 22. An alternative parking meter could use a single sensor including a low power proximity sensor integrated with a directional sensor. The integrated sensor would operate in a low power mode with only the low-power proximity sensor active and, when the proximity sensor detects an object in proximity to the meter, the directional sensor would be activated to detect the presence of the object in a predetermined location relative to the meter. Yet another alternative parking meter could use a single sensor that operates in a low-power mode and in a high-power mode. In the low-power mode, the single sensor of this alternative would be able to detect an object in proximity to the meter, but would not be able to detect the location of the object relative to the meter (an omnidirectional mode). In the high power mode, which would be activated when the sensor in the low-power mode detects an object, the single sensor would be switched to the high-power mode in order to sense the location of the object relative to the meter (a directional mode).

We claim:

1. A method of operating a parking meter, the method comprising:
    (a) detecting an object in proximity to a parking meter by a proximity sensor, the detecting being based on a change in a proximity measurement at the meter, wherein the proximity sensor is selected from the group consisting of: a radio transceiver, a magnetometer, an optical sensor, and a pressure sensor;

(b) activating a directional sensor in response to detecting the object;
(c) receiving sensor data at a meter processor from the directional sensor, the received sensor data indicating a predetermined direction to the detected object relative to the parking meter;
(d) determining a presence of the object, or lack thereof, in the predetermined direction based on a proximity measurement by the proximity sensor and the sensor data; and
(e) upon a determination of the presence of the object, or the lack thereof, storing an indication of the presence of the object, or the lack thereof, along with a time of the determination.

2. The method as in claim 1, wherein the proximity sensor is a magnetometer coupled to the parking meter and wherein the proximity measurement is indicative of a magnetic field at the parking meter.

3. The method as in claim 1, further comprising in (d):
determining a confidence level of the presence of the object in a space associated with the parking meter based on the proximity measurement and the received sensor data; and
subsequent to determining the confidence level, varying an action of the meter based on the confidence level.

4. The method as in claim 3, further comprising:
comparing the proximity measurement to a baseline measurement, the baseline measurement representing an expected proximity measurement when the object is not present; and
positively detecting the object present if the proximity measurement differs from the baseline measurement by more than a threshold value.

5. The method as in claim 3, wherein the varying the action comprises: resetting time remaining on the parking meter to zero or another desired amount.

6. The method as in claim 3, wherein the varying the action comprises: updating payment information associated with the object on a memory module of the meter.

7. The method as in claim 1, further comprising, prior to (a), determining a presence of the object in proximity to the parking meter.

8. The method as in claim 1, wherein the directional sensor is at least one of:
(a) an ultrasonic sensor,
(b) an optical sensor,
(c) a passive infrared sensor,
(d) an active infrared sensor, and
(e) a radar sensor.

9. The method as in claim 8, wherein the optical sensor is a digital camera.

10. The method as in claim 1, wherein the directional sensor is wirelessly connected to the meter.

11. The method as in claim 1, further comprising: tuning the directional sensor by varying sensitivity and directional gains for the directional sensor.

12. The method as in claim 11, wherein the sensitivity and directional gains are determined empirically.

13. A parking meter comprising:
(a) a proximity sensor configured to detect an object in proximity to the parking meter based on a proximity measurement, and configured to produce a trigger signal in response to the detection of the object, wherein the proximity sensor is selected from the group consisting of: a radio transceiver, a magnetometer, an optical sensor, and a pressure sensor;
(b) a directional sensor configured to detect the object in a predetermined direction relative to the parking meter; and
(c) a control module coupled to the proximity sensor and the directional sensor and configured to:
   i. receive the trigger signal from the proximity sensor and, in response to receiving the trigger signal, activate the directional sensor,
   ii. receive sensor data from the directional sensor,
   iii. determine a presence of the object, or lack thereof, in the predetermined direction based on the proximity measurement and the received sensor data, and
   iv. upon a determination of the presence of the object, or lack thereof, store an indication of the presence of the object, or lack thereof, along with a time of the determination.

14. The parking meter as in claim 13, wherein the directional sensor is at least one of:
(a) an ultrasonic sensor,
(b) an optical sensor,
(c) a passive infrared sensor,
(d) an active infrared sensor, and
(e) a radar sensor.

15. The parking meter as in claim 14, wherein the optical sensor is a digital camera.

16. The parking meter as in claim 13, wherein the control module is further configured to determine a confidence level of the presence of the object in a space associated with the parking meter based on the proximity measurement and the received sensor data.

17. The parking meter as in claim 16, wherein the control module is further configured to, subsequent to determining the confidence level, vary an action of the meter based on the confidence level.

18. The parking meter as in claim 17, wherein the action of the meter is to reset time remaining on the parking meter to zero or another desired amount.

* * * * *